United States Patent

[11] 3,533,494

| [72] | Inventors | Romas B. Spokas;<br>Grant H. Smith, Rockford, Illinois |
|---|---|---|
| [21] | Appl. No. | 802,531 |
| [22] | Filed | Feb. 26, 1969 |
| [45] | Patented | Oct. 13, 1970 |
| [73] | Assignee | Borg-Warner Corporation,<br>Chicago, Illinois<br>a corporation of Delaware |

[54] CLUTCH WITH ADJUSTABLE LEVERS
7 Claims, 3 Drawing Figs.

[52] U.S. Cl. ............................................. 192/99,
192/70.26, 192/70.29
[51] Int. Cl. ............................................. F16d 13/75
[50] Field of Search ............................................. 192/99(A),
70.26, 70.29, 70.3, 111(A)

[56] References Cited
UNITED STATES PATENTS

| 1,993,124 | 3/1935 | Tower | 192/70.12 |
|---|---|---|---|
| 2,765,060 | 10/1956 | Stenger | 192/99AX |
| 3,334,716 | 8/1967 | Spokas | 192/99AX |
| 3,406,801 | 10/1968 | Root | 192/99A |

*Primary Examiner* — Benjamin W. Wyche, III
*Attorneys* — Donald W. Banner, Lyle S. Motley, C. G. Stallings and William S. McCurry

ABSTRACT: A friction clutch assembly includes a system of operating levers having linkages adjustably supporting the fulcrums of the levers for arranging the engaging surfaces of the levers in a common plane. Radially adjustable stops are provided for restraining movement of the linkage during clutch rotation.

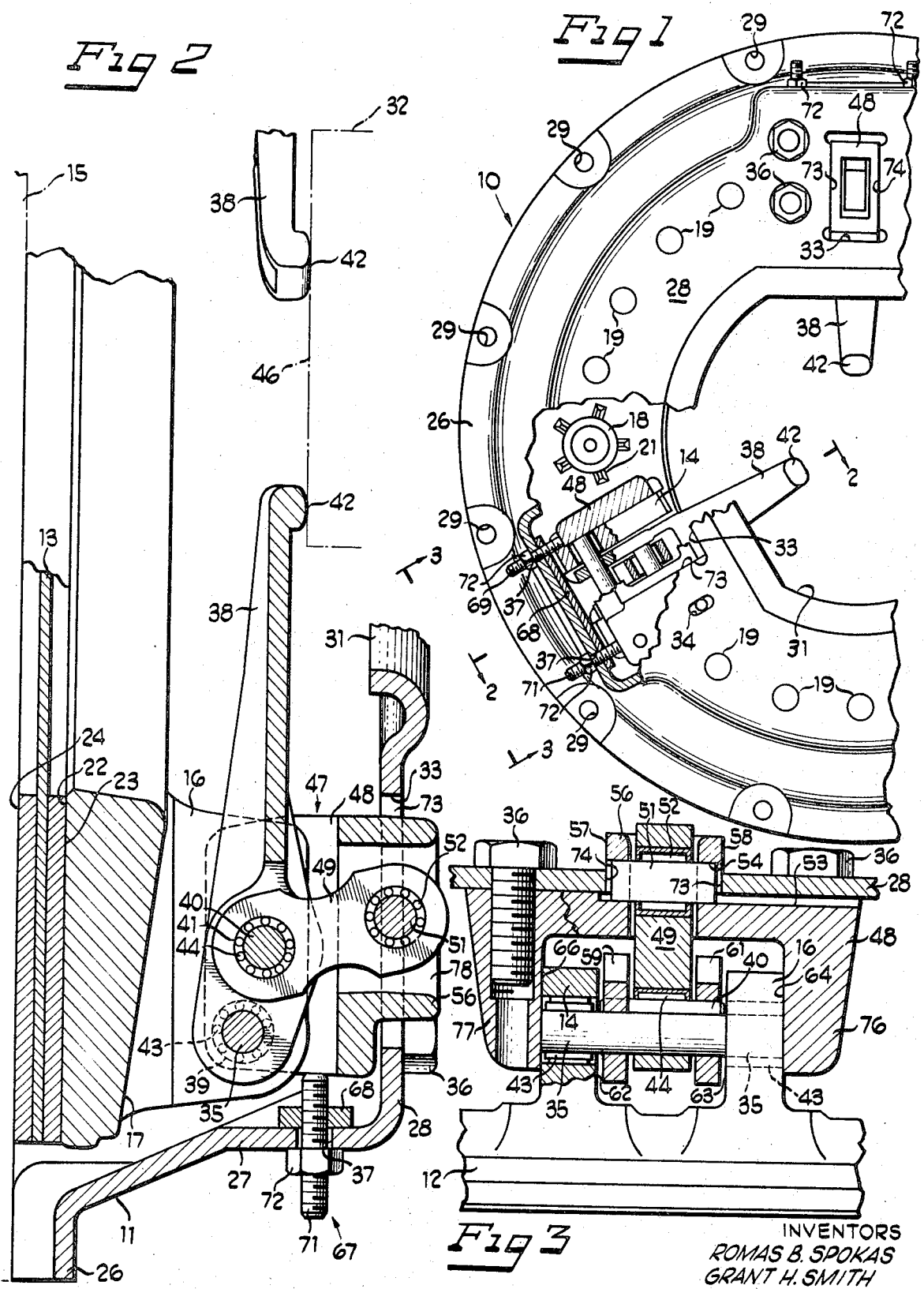

3,533,494

CLUTCH WITH ADJUSTABLE LEVERS

SUMMARY OF THE INVENTION

The present invention relates generally to friction clutches and more particularly to adjustable operating levers therefor.

A principal object of the present invention is to provide improved linkage for adjustably mounting the operating levers of a friction clutch assembly; a further object is to provide means for maintaining a preselected adjusted position of said levers during clutch rotation.

BRIEF DESCRIPTION OF THE DRAWING

FIG. 1 is a fragmentary end view of a clutch assembly according to the present invention, with portions broken away to reveal a mounting for an operating lever;

FIG. 2 is an enlarged fragmentary section view taken generally along the line 2–2 of FIG. 1; and FIG. 3 is an enlarged fragmentary view with portions broken away to reveal the construction of the lever mounting structure viewed generally in the direction of the arrows 3–3 of FIG. 1.

DESCRIPTION OF THE PREFERRED EMBODIMENT

Referring in greater detail to the drawing, the reference character 10 indicates a friction clutch assembly including a cover plate 11 and a pressure plate 12 adapted for cooperation with a friction plate 13 and a flywheel 15 indicated by broken lines in FIG. 2. The flywheel and friction plate are typical of constructions well known in the clutch art and accordingly, extended description of these elements is believed unnecessary.

Pressure plate 12 is of a generally annular configuration preferably including three pairs of circumferentially spaced drive lugs 14, 16 projecting axially from the rear surface 17 of the pressure plate. A plurality of springs 18 are compressed between spring seats 19 in cover plate 11 and spring seats 21 on the rear surface 17 of pressure plate 12. Springs 18 preload pressure plate 12 toward the left as viewed in FIG. 2 urging the front face 22 of the pressure plate into frictional engagement with friction face 23 of friction plate 13. Springs 18 normally preload the clutch assembly to an engaged condition in which the friction faces 23 and 24 of friction plate 13 are clamped between flywheel 15 and the front face 22 of pressure plate 12 for the transmission of torque from the flywheel to the friction plate.

Cover plate 11 includes an annular rim portion 26 merging into a sidewall portion 27 which in turn merges into a generally annular backwall portion 28. Rim portions 26 includes a plurality of mounting apertures 29 spaced around the circumference arranged to receive cap screws or the like for securing cover plate 11 to flywheel 15. Backwall portion 28 defines an opening 31 for receiving portions of an actuating mechanism 32 indicated in broken lines in FIG. 2. Backwall portion 28 also includes circumferentially spaced radially extending adjusting slots 33 adapted to receive portions of a lever mounting linkage to be described in more detail hereinafter. In the preferred form of the invention three adjusting slots 33 are provided defined in part by the spaced surfaces 73, 74, each adjusting slot having associated therewith four elongated apertures 34 for receiving a like number of cap screws 36. Sidewall portion 27 includes a pair of apertures 37, each pair of apertures 37 being spaced apart and disposed to opposite sides of an associated adjusting slot 33.

Operating levers 38, preferably three in number, are provided for axially shifting pressure plate 12 toward the right as viewed in FIG. 2, thus defining a disengaged condition of the clutch assembly in which friction plate 13 is released from pressure plate 12 and flywheel 15. While plural levers and associated linkages are provided, these elements are described in the singular inasmuch as they are of like construction. Each of the operating levers 38 is provided with an outer pivotal connection 39 including a pivotal connecting pin 35 connecting the lever to pressure plate 12 by means of a pair of drive lugs 14, 16. Each lever 38 is also provided with a fulcrum connection 41 disposed inwardly of and closely adjacent to a respective outer connection 39 including a fulcrum pin 40 connecting the lever to a mounting linkage. The outer pivotal connections 39 and fulcrum connections 41 may be provided with antifriction bearings, if desired, such as needle bearings 43, 44. The radially inner end of each lever 38 includes a thrust surface 42 adapted to bear against actuating mechanism 32. When actuating mechanism 32 is moved axially inwardly toward the pressure plate, the inner ends of the levers are also moved axially in the same direction pivoting the levers about their fulcrum connections and moving the pressure plate axially in the opposite direction to the released condition.

In order to provide smooth disengagement of pressure plate 12 from friction plate 13, it is desirable that the several levers 38 exert equal and simultaneous separating forces on the pressure plate through respective pivotal connections 39. Accordingly it is desirable to provide means for adjusting the positions of the several fulcrum connections 41 in order to accommodate manufacturing tolerances while assuring that the several thrust surfaces 42 are adjustable to a preselected common plane indicated by the face 46 of actuating mechanism 32.

Improved mounting linkages 47 are provided for independently adjusting and supporting the fulcrum connection of each of the levers 38 on cover plate 11. Each mounting linkage assembly includes a support 48 arranged for radial sliding movement inwardly and outwardly along backwall portion 28 of cover plate 11 in a path generally parallel to the associated lever. Each support 48 includes a pair of spaced wall portions 76, 77 engaging a pair of drive lugs 14, 16 providing a circumferential driving connection between cover plate 11 and pressure plate 12 while accommodating radial sliding movement of the support with respect to the pressure plate and cover plate. Another principal element of the mounting linkage is the drag link 49 arranged to extend generally axially between a support 48 and an associated lever 38. Drag link 49 includes a first pivotal connection to support 48 comprising the pivot pin 51 and roller bearing 52. Support 48 includes a groove 53 extending from bore 54, and arranged to permit assembly of pivot pin 51 through bearing 52 in drag link 49. The projecting key portion 56 of support 48 includes a pair of sidewalls 57, 58 received within the slot 33 between the spaced surfaces 73, 74. The slot 33 thus provides a radial guide for guiding the sliding movement of the support 48 and also serves to retain pivot pin 51 in bore 54. Drag link 49 has another pivotal connection coinciding with the fulcrum connection 41. Fulcrum pin 40 extends through the spaced leg portions 59, 61 of lever 38 and through the bearing 44 in drag link 49. Fulcrum pin 40 is retained against endwise displacement by the inner sidewalls 62, 63 of drive lugs 14, 16. Pivotal connecting pin 35 also extends through the leg portions 59, 61 of lever 38 and into the bearings 43 in drive lugs 14, 16. The inner walls 64, 66 of support 48 serve to retain the pivotal connecting pin 35 against endwise displacement.

Assembly of a lever and mounting linkage is accomplished by connecting a lever to a pair of pressure plate drive lugs by means of a pivotal connecting pin 35 and to a drag link by means of a fulcrum pin 40. The lever is positioned substantially parallel to the pressure plate moving fulcrum pin 40 between the pair of drive lugs 14, 16. A support 48 is installed so that a pair of spaced wall portions 76, 77 are disposed on opposite sides of the pair of drive lugs, drag link 49 extending into aperture 78 for alignment with bore 54. Pivot pin 51 is inserted through bore 54 and drag link 49 by means of groove 53. When all the levers and mounting linkages are connected to the pressure plate, the cover plate is secured to the various supports 48 by cap screws 36, the slot surfaces 73 then retaining pivot pins 51 against endwise displacement from bores 54. Thus each mounting linkage includes means for axially retaining its pivotal connecting members.

It is believed evident from an inspection of FIG. 2 that radial movement of support 48 is effective to reposition drag link 49 such that the fulcrum 41 of lever 38 is moved axially. Axial movement of fulcrum 41 in turn provides axial movement of lever thrust surface 42. A support 48 is secured in a selected radial position on backwall 28 by means of the cap screws 36, however additional radial positioning means is provided in the form of a stop assembly 67 including the bar 68 and pair of adjusting screws 69, 71. A bar and pair of adjusting screws are disposed radially outwardly of each support 48, the adjusting screws forming adjustable radial abutments for engaging portions of the support 48. It is believed evident that rotation of the clutch assembly is effective to generate centrifugal forces urging supports 48 outwardly against their associated stop assemblies 67.

It is contemplated that upon initial construction of the clutch assembly, or following repairs or reconditioning, it would be desirable to adjust the thrust surfaces of the levers to a common plane for cooperation with the actuating mechanism 32. In such case the cap screws 36 and adjusting screws 69, 71 are backed off to permit radial sliding movement of support 48. Each support 48 is then moved radially inwardly or outwardly until the thrust surface of its associated lever bears against a surface corresponding with the face 46. The cap screws 36 are then tightened to secure the supports in place and the adjusting screws 69, 71 are turned to abut against the supports. The adjusting screws are then secured against further movement by lock nuts 72.

While a preferred form of the invention has been shown and described in the drawing and foregoing description, it is to be understood that various alterations and modifications thereof remain within the spirit of the invention and scope of the following claims.

We claim:

1. In a friction clutch assembly including a rotatable friction plate, a cover plate, an axially shiftable pressure plate arranged for selectively clamping and releasing said friction plate to define engaged and disengaged conditions of said clutch assembly, and a plurality of radially disposed levers for axially shifting said pressure plate with respect to said cover plate and said friction plate, each of said levers including an outer pivotal connection to said pressure plate, an inner axially movable thrust surface, and a fulcrum connection closely adjacent said outer pivotal connection, improved linkage for adjusting the thrust surfaces of said levers to a preselected position comprising; a drag link and support for each of said levers, each of said supports being releasably secured to said cover plate for radially adjustable movement along a path substantially parallel to its associated lever, each of said drag links extending generally axially and having a first pivotal connection with its associated support and a second pivotal connection coinciding with the fulcrum connection of its associated lever, radial adjusting movement of a support being effective to reposition its associated drag link for shifting the axial positions of the fulcrum connection and thrust surface of its associated lever.

2. In a friction clutch assembly according to claim 1, said cover plate including a radially adjustable stop member for each of said supports, each of said stop members being arranged and disposed radially outwardly of an associated support for abutment therewith providing means for limiting radially outward movement of said support and thereby maintaining adjustment of said lever thrust surface during rotation of said clutch assembly.

3. In a friction clutch assembly according to claim 1, said cover plate including a plurality of radially disposed slots each defining a path substantially parallel to one of said levers, each of said supports having a projecting key portion receivable within a respective slot for guiding the radially adjustable movement thereof, and having a pair of spaced wall portions slidably embracing a portion of said pressure plate providing a driving connection between said cover plate and pressure plate.

4. In a friction clutch assembly according to claim 1, said cover plate including a plurality of radially disposed slots each having a pair of spaced surfaces defining a path substantially parallel to one of said levers, each of said supports having a projecting key portion receivable within a respective slot between said pair of spaced surfaces for guiding the radially adjustable movement thereof, said projecting key portion including a bore receiving a pivot pin connecting said drag link to said support, at least one of said spaced slot surfaces providing retaining means for retaining said pivot pin against endwise displacement from said bore.

5. In a friction clutch assembly according to claim 1, said pressure plate including a pair of drive lugs for each of said levers, each pair of drive lugs including a bore, each of said levers being pivotally connected to a respective pair of drive lugs by means of a pivotal connecting pin received within said bore, each of said supports including a pair of spaced wall portions embracing a respective pair of drive lugs and masking said bore retaining said pivotal connecting pin against endwise displacement from said bore.

6. In a friction clutch assembly according to claim 1, each of said levers including a pair of spaced leg portions embracing an end portion of said drag link, said drag link and lever being pivotally connected to each other by means of a fulcrum pin, said lever leg portions being received between a pair of spaced drive lugs projecting from said pressure plate, said drive lugs having wall portions adjacent opposite end portions of said fulcrum pin retaining said fulcrum pin against endwise displacement from said lever and drag link.

7. In a friction clutch assembly according to claim 1, said cover plate including a plurality of radially disposed slots each having a pair of spaced surfaces defining a path substantially parallel to one of said levers, said pressure plate including a plurality of pairs of drive lugs, each pair of drive lugs being arranged and disposed adjacent one of said slots and including a bore for receiving an outer pivotal connecting pin, each of said levers having a pair of spaced leg portions including an outer pivotal bore and a fulcrum bore, each of said supports having a projecting key portion extending into a respective slot for guiding the radially adjustable movement thereof and including a drag link bore extending between said spaced surfaces, and having a pair of wall portions slidably embracing a respective pair of drive lugs providing a driving connection between said cover plate and pressure plate, each of said levers being pivotally connected to a respective pair of drive lugs by means of a pivotal connecting pin retained between said wall portions and being pivotally connected to a respective drag link by means of a fulcrum pin retained between a respective pair of drive lugs, said drag link being pivotally connected to said support by means of a connecting pin retained between said spaced slot surfaces.